INVENTOR.
SAMUEL I. BOUSMAN
ARTHUR M. KIVARI
ROBERT B. THOMPSON
ATTORNEY

Feb. 23, 1965         S. I. BOUSMAN ETAL         3,170,770
         APPARATUS FOR CONTACTING SOLIDS AND LIQUID
Filed June 9, 1960                           3 Sheets-Sheet 3
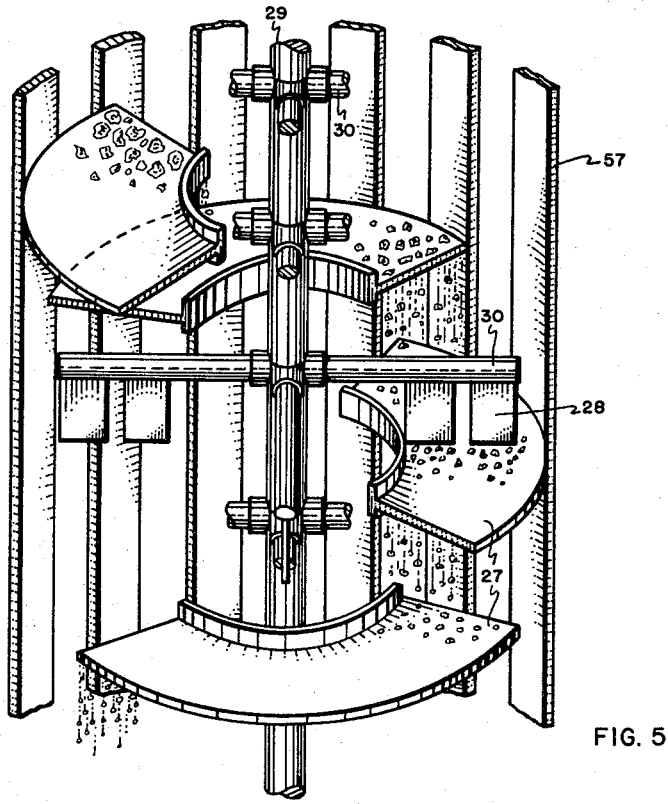
FIG. 5
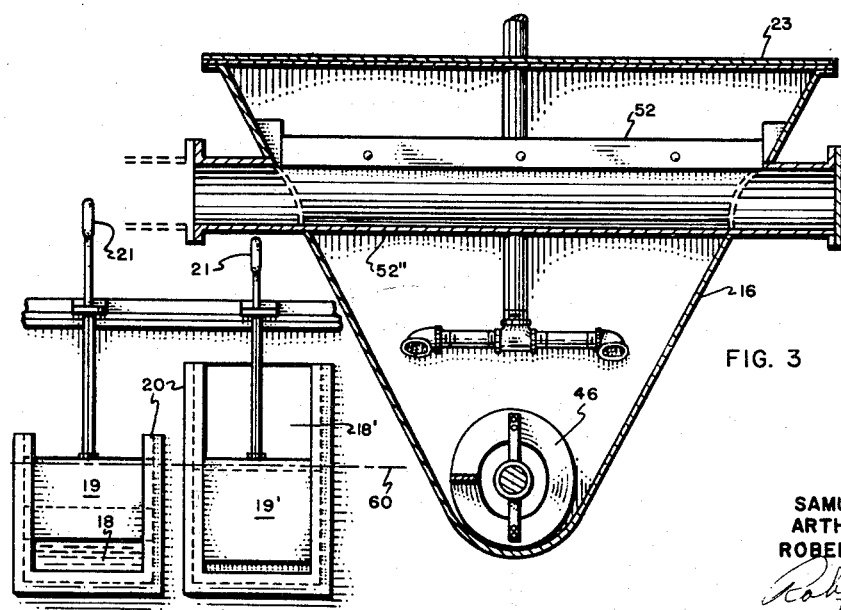
FIG. 3
FIG. 4
INVENTOR.
SAMUEL I. BOUSMAN
ARTHUR M. KIVARI
ROBERT B. THOMPSON
ATTORNEY United States Patent Office 3,170,770
Patented Feb. 23, 1965

3,170,770
APPARATUS FOR CONTACTING SOLIDS
AND LIQUID
Samuel I. Bousman, Santa Cruz, and Arthur M. Kivari, San Mateo, Calif., and Robert B. Thompson, Salt Lake City, Utah, assignors to The Eimco Corporation, Salt Lake City, Utah, a corporation of Delaware
Filed June 9, 1960, Ser. No. 35,047
7 Claims. (Cl. 23—287)

This invention relates generally to liquid-solids contact and in particular to such contact wherein liquid-solid reaction occurs.

It is a principal object of the invention to provide ways and means for effecting continuous reaction between liquid and solids with concomitant separation of reaction products and continued reaction of residual material.

A further object is the provision of ways and means enabling continuous reaction of coarse solids with simultaneous separation of reaction products.

Another object is to provide ways and means for carrying out the foregoing objects by which contact is carried out in a plurality of stages wherein reaction and classification occur simultaneously.

Still another object is the provision of apparatus for carrying out the above objects and having a self-contained eductor system to rapidly remove dust, fumes, and the like from an early stage for introduction into a later stage.

A still further object is provision of a particular construction enabling solids classification and discharge that is efficient of operation and readily accessible for maintenance and upkeep.

And a further object is to provide ways and means embodying the foregoing objects that are particularly adapted to slaking of coarse lime solids of any grade on a continuous high-capacity basis.

The foregoing and possibly other objects are attained by the invention which contemplates the steps of introducing coarse solids into the first chamber of a container having first and second liquid-containing chambers in hydraulic communication and with a common overlying free-board space, subjecting solids in the first chamber to liquid contact while simultaneously effecting release of a first portion of reacted solids directly to the second chamber for continued reaction while passing residual coarse solids downwardly through said first chamber for continued reaction, separating a second portion of relatively fine reacted solids from the coarse residual solids after passage through said first chamber, passing such coarse material into and through a third chamber maintained in a second container in hydraulic communication with the first container and there effecting further reaction with simultaneous classification to yield a reacted third portion of fine solids and an unreacted coarse fraction, removing the coarse fraction from the third chamber, passing the second portion of fine reacted solids into the second chamber of the first container and there co-mingling it with said first portion while subjecting the mixture to gentle agitation to maintain solids in suspension to effect further reaction, thence passing such mixture of fine solids into the third chamber to co-mingle therein with said third portion of fine solids, and discharging the resulting mixture from the third chamber at a point functionally remote from the point of removal of the coarse fraction.

In accordance with a specific modification of the invention, dust and fumes are removed from the free-board space overlying the first and second chambers, are wetted by contact with liquid spray which carries them into the third chamber and may simultaneously initiate reaction.

A specific feature of the invention enables removal and wetting of the dust and fumes by the expedient of employing the wetting spray in a venturi-like eductor serving the dual function of creating vacuum to evacuate the first container, while simultaneously maintaining efficient wetting and reaction conditions.

In order that the invention may be more readily understood and carried into effect, reference is made to the accompanying drawings which are offered by way of example only, and are not to be taken as limiting the invention the scope of which is defined by the appended claims rather than by the description preceding them.

In the drawings:

FIG. 3 is a view taken in the plane of line 3—3 of FIG. 1.

FIG. 4 is a view taken in the plane of line 4—4 of FIG. 1.

FIG. 5 is a partial isometric view showing the shelf and rabbler arrangement in the center section of the apparatus.

Figure 1:
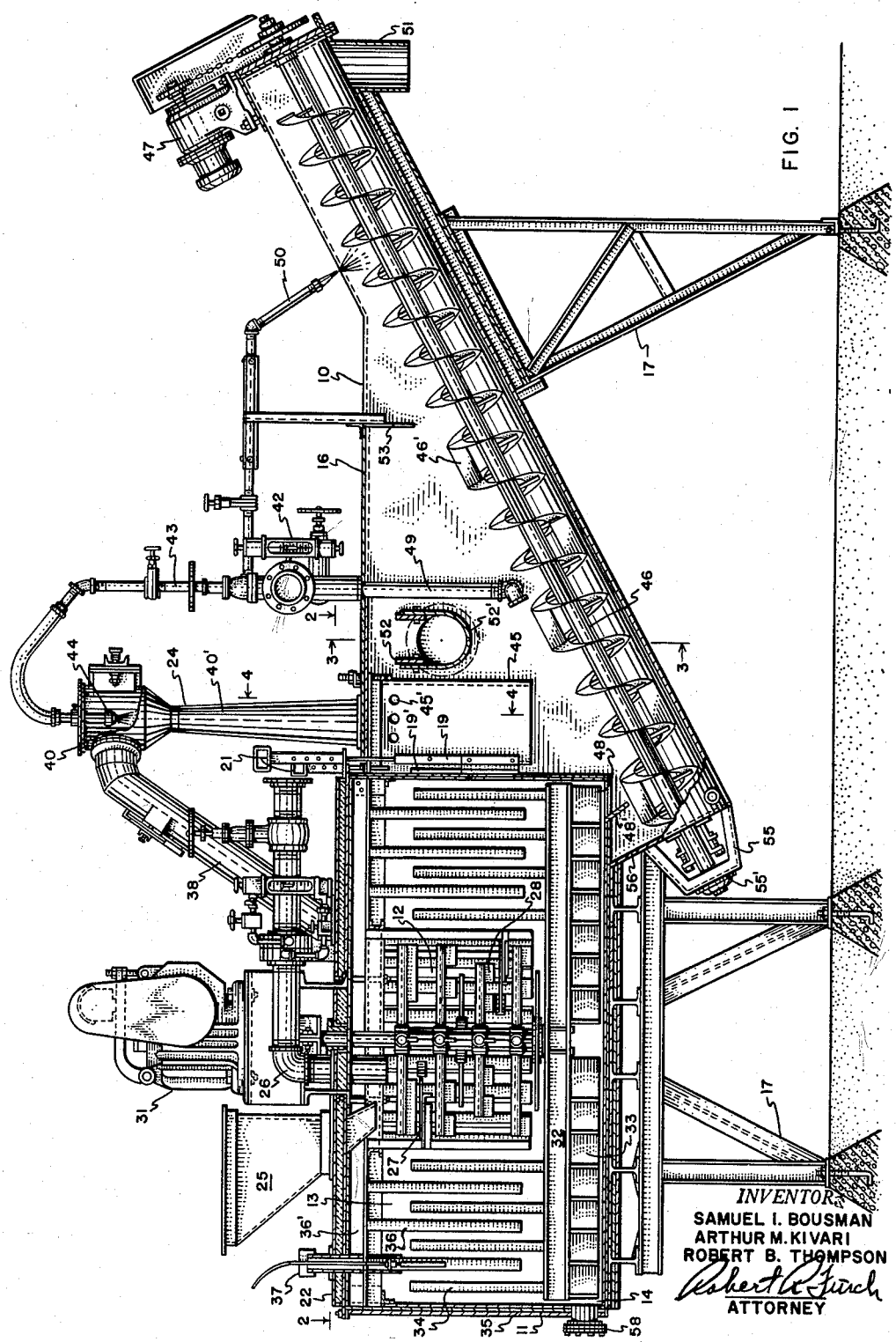
FIG. 1 is a sectional view of apparatus embodying the invention, certain parts being shown in elevation and others partially cut away for purposes of clarity.
Figure 2:
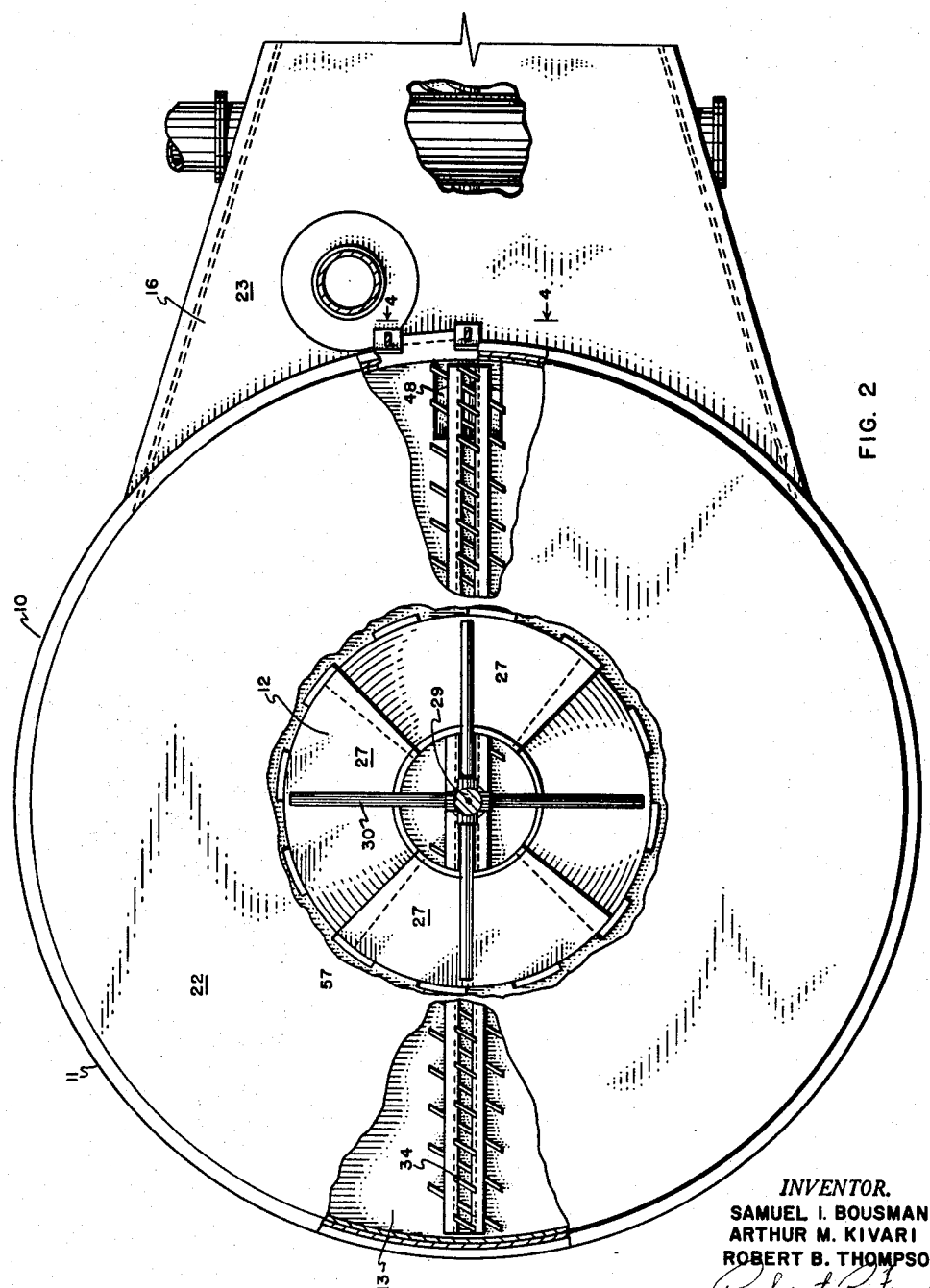
FIG. 2 is a partial top plan view of the apparatus shown in FIG. 1, taken generally in the plane of line 2—2 of FIG. 1, portions of the tank cover being cut away.

The overall apparatus, generally designated 10, comprises a first container or tank 11, having a first centrally located contacting chamber 12 concentrically surrounded by a second chamber 13, both of which overly a common bottom chamber 14. Adjacent the first tank there is provided a second tank 16. Both tanks are supported on common supports 17.

Annular chamber 13 communicates with the second tank through openings 18 and 18′ which are respectively fitted with control gates 19 and 19′ for purposes to be hereinafter explained. As is best shown in FIG. 4, gates 19 and 19′ are slidably mounted in channels 20 and their elevation controlled by handles 21 fitted with suitable latching means not shown.

The first tank is closed by cover 22 and the second tank by cover 23. As hereinafter described in more detail, the free-board spaces of the tanks are inter-connected by an eductor, generally designated 24 and a froth passage 18′.

Solids to be treated are supplied to the unit through a feed box 25 and a controlled liquid supply is introduced via conduit 26.

In the center of the first chamber 12 are shelf members 27 which, as best shown in FIG. 5, are arranged in vertically spaced overlapping relationship. Solids are moved along shelves 27 by rabblers 28 mounted to extend radially from a center shaft 29. For purposes of clarity, only one set of rabblers is shown but mounting stubs 30 indicate generally location of the others.

Center shaft 29 is rotatably driven by a suitable drive 31 mounted above the tank cover. A rake arm 32 with attached blades 33 is secured to the lower end of shaft 29. The rake blades are mounted to effect outward raking of solids in the bottom of tank 11.

Mounted to extend upwardly from the rake arm 32, are vertical pickets 34 positioned to pass between fixed pickets 36 depending from a suitable cross member 36′ mounted in the upper portion of tank.

For process control, a temperature sensing unit 37 is provided which reads temperatures in the tank and actuates a suitable mixing valve (not shown) to provide process water of the proper temperature, via a supply conduit 26, in amounts sufficient to carry out the reaction and maintain the desired reaction temperatures and dilution ratios.

If the reaction is so exothermic as to generate excess heat, the control system will operate to supply cool water rather than hot, and vice versa. Temperature control, especially where heat must be added, is facilitated by insulating the tanks as indicated at 35.

As previously noted, the eductor 24 connects the freeboard spaces and serves to transfer dust and fumes from the first to the second tank. The eductor comprises a first vapor line 38 extending between the first tank free-board and a center section 40 which in turn connects to a second line 40' shaped at its upper portion to provide a venturi section. Water is supplied through a control system generally designated 42, whence it passes into water line 43 and finally is discharged into the eductor, through a jet 44, as a fine, high-velocity spray.

The eductor terminates at the second tank cover and a feedwell in the form of a conduit 45 extends from such cover to below the liquid level in the tank. This confines wetted dust and directs it into the body of liquid thereby preventing short circuiting and insuring sufficient detention to complete reaction. In order to permit gas escape openings 45' are provided in conduit 45 above the liquid level.

In order to effect separation and removal of non-reacted solids, there is mounted in the channel-like bottom of the second tank a classifier screw 46. The screw is provided with agitating blades 46' and is rotatably driven by a suitable drive unit 47.

Coarse solids in the first tank are raked outwardly to fall through bottom port 48 directly into the screw mechanism. It is important that solids be introduced at a point above the lowermost screw flight in order to prevent trapping of abrasive solids between the end flight and tank closure plate. In the embodiment shown, this is accomplished by means of sloped deflector plate 48' which directs solids upstream of the bottom flight. Obviously other arrangements may be employed, but the plate shown has proven satisfactory.

Water as needed for proper dilution and classification is introduced into the second tank via conduit 49 leading from the previously mentioned water control mechanism 42. Water for final wash of dewatered coarse solids is introduced via conduit 50. Dewatered coarse solids discharge via conduit 51 whence they may be carried away by any convenient means, not shown.

Product from the second tank, either in solution or suspension, overflows adjustable weir edge 52 into open trough 52' and a connecting discharge conduit, not shown. Uncondensed gases also escape through this route.

In order to maintain a vapor tight seal in the free-board, there is provided a baffle plate 53 extending downwardly from the cover to an elevation below the normal liquid level.

In connection with the screw, it is a feature of advantage that its lower bearing 55' is rendered readily accessible by enclosing it in a removable housing member 55 located at the base of the screw on face plate 56. A shaft seal is provided in face plate 56.

Referring again to FIG. 5, it will be noted that the rabble shelves are openly supported to provide communication with the annular second chamber 13. This enables fine solids to pass directly into such outer chamber. In the embodiment shown, the support is accomplished by a perforated baffle formed from plurality of vertical members 57 depending from cross beams 36' and to which the shelves are secured.

Both tanks are equipped with suitable clean out ports, such as shown at 58.

As is best seen from FIG. 4, the gate arrangement comprising previously mentioned openings 18 and 18' and gates 19 and 19', establishes communication between the first and second tanks at two different levels. The first or left hand opening 18 is the primary hydraulic communication between tanks and is normally set to open well below the upper edge of the overflow weir (indicated in FIG. 4 by broken line 60). This insures submerged hydraulic communication between the tanks. On the other hand, the upper edge of gate 19' is adjusted so that its upper level is at or slightly above the overflow weir level. Thus, the upper opening provides passage for floating froth or scum.

In a commercial scale test on slaking lime, coarsely crushed lime in the form of burned limestone and of a size below 2 inches and above one inch was introduced through feed chute 25 to fall onto the uppermost shelf of the central slaking compartment. Water for reaction was introduced through conduit 26 in a sufficient quantity and at a temperature to give a dilution ratio of 4 parts water to 1 part solids while maintaining the desired reaction temperature level. Reaction temperature in the central compartment was maintained in the range from 160° F. to 190° F. As is known, lime slaking occurs rapidly on the particle surface with rapid disintegration of reacted material. Hence, as the rabbler blades 28 rotate, reacted lime particles are released along with unreacted solids of smaller sizes. Such solids migrate outwardly through the open sides into the annular compartment. Heavier unreacted solids remain in the central chamber to undergo further reaction as they tumble from the upper to lower shelf portions. This action continues until solids, now considerably reduced in size, reach the bottom of the inner compartment, whence they fall into the common bottom chamber to be raked outwardly for discharge into the screw conveyor.

Thus, in accordance with the invention, the coarsest particles are subjected to the longest detention under ideal reaction conditions while finer particles of a suspendable size are released, those requiring it, undergoing further reaction in the annular chamber.

In other tests, lime solids coarser than 4 inches diameter were successfully slaked at temperatures in the broad range of 140° F. to 200° F. and over a wide range of dilutions. In some cases unburned cores and inert materials discharged from the screw were as coarse as 4 inches.

As indicated above, solids disintegration during passage through the central compartment releases some particles that, although not completely reacted, are light enough to be maintained in suspension with mild agitation. Such agitation is effected by rotation of picket arms 34 acting in conjunction with stationary pickets 36 to impart a gentle rolling action within the compartment which maintains the particles in suspension until reaction is complete whereupon the solids further disintegrate to a fineness as usually encountered in milk of lime.

Unreacted material in the bottom compartment is, as previously noted, raked outwardly to drop through bottom opening 48 into the screw conveyor whence it moves through the second tank. Action of the screw with its associated lifters and the addition of dilution water effects further reaction and solids separation. Thus, by the time the solids discharge they are substantially free of burned lime content and comprise waste material, such as unburned cores or inerts.

Because of its ability to aid disintegration with immediate separation of reacted and unreacted solids, the present invention makes it possible to handle material of extremely large size to yield a substantially pure product free from unreacted or other waste material.

In many chemical reactions, a considerable quantity of fumes and dust are generated which not only are noxious if permitted to discharge into the atmosphere, but also result in considerable waste. This invention overcomes this problem by its novel eductor system which withdraws dust and fumes from the first tank into and through a venturi section where contact is made with a high-velocity liquid spray that both wets and effects immediate discharge of the solid content into the classifier compartment where reaction is completed. It is noteworthy that the wetting spray is utilized to create vacuum by which the fumes are withdrawn from the slaking compartment.

We claim:

1. Apparatus for contacting solids with liquid comprising a first tank having a centrally positioned first chamber defined by spaced-apart sidewall members terminating above the tank bottom and an annular second chamber in hydraulic communication with said first chamber, means for supplying liquid to said tank, a plurality of solids-supporting shelf members mounted in said first chamber on said spaced apart members and arranged in vertically spaced overlapping relationship, means for supplying solids to said first chamber to be received therein by an upper one of said spaced apart shelf members, a rotatably driven shaft exending vertically through said first chamber, first rake means comprising a plurality of vertically-spaced laterally extending arms mounted on said shaft within said first chamber and adapted to rake across the surfaces of said solids-supporting shelf members upon rotation of said shaft, a solids discharge opening adjacent the bottom of said first tank, second rake means comprising laterally extending arms mounted on said shaft below said first chamber and adjacent the bottom of said first tank and means on said arms for engaging and moving solids across said tank bottom towards said solids outlet upon rotation of said shaft, liquid discharge means in an upper portion of said second chamber, a second tank adjacent said first tank and in hydraulic communication therewith through both said liquid discharge means of said second chamber and said solids discharge opening of said first tank, liquid discharge means in said second tank controllable to define an upper liquid level in both of said tanks below the tops thereof, solids discharge means in said second tank at an elevation above said upper liquid level, solids conveying means in said second tank terminating at one end at said solids discharge means therein and mounted to receive solids from said first tank adjacent its other end, cover means closing the tops of both tanks thereby defining free-board spaces in said first and second tanks above the liquid level therein, conduit means interconnecting said free-board spaces, means in said conduit creating vapor flow from said first to said second tank, and a feedwell in said second tank having its upper end positioned to receive vapors from said conduit and terminating at its lower end at an elevation below said liquid discharge means of said second tank.

2. Apparatus according to preceding claim 1 with the addition of agitating means in said annular second chamber, comprising a plurality of spaced apart elongated members mounted on the laterally extending arms of said second rake means and extending upwardly therefrom into said annular second chamber.

3. Apparatus according to preceding claim 1 in which said solids conveying means comprises a screw mounted with one end extending below said solids discharge opening of said first tank and positioned to receive solids from said opening at a point upstream from the endmost flight of said screw, said screw is provided with spaced apart solids agitating element and liquid supply conduit means are provided positioned to introduce liquid into said second tank below the liquid level therein and adjacent said screw.

4. Liquid solids contact apparatus comprising a tank, a liquid inlet and means for maintaining a predetermined liquid level in said tank, a perforated baffle extending downwardly into the tank to terminate below said predetermined level and above the bottom of said tank thereby to define three communicating chambers including first and second laterally adjoining bottomless chambers overlying a third chamber on the tank bottom, a plurality of vertically spaced horizontal shelf segments in said first chamber arranged in staggered overlapping relationship, feed means adapted to introduce solids onto the surface of an upper one of said shelf segments, raking means mounted for movement across the surfaces of said shelf segments to rake solids therefrom, agitating means operable in said second chamber, said means for maintaining a predetermined liquid level in said tank including an outlet adjacent said tank bottom in said third chamber, and rake means mounted for movement across said tank bottom in said third chamber to move settled solids toward said outlet.

5. Liquid solids contact apparatus comprising a first tank, a liquid inlet, a perforated baffle extending downwardly into the tank to terminate therein above the bottom of said tank thereby to define three communicating chambers including first and second laterally adjoining bottomless chambers overlying a third chamber on the tank bottom, a plurality of vertically spaced horizontal shelf segments in said first chamber arranged in staggered overlapping relationship, feed means adapted to introduce solids onto the surface of an upper one of said shelf segments, raking means mounted for movement across the surfaces of said shelf segments to rake solids therefrom, agitating means operable in said second chamber, an outlet adjacent said tank bottom in said third chamber, rake means mounted for movement across said tank bottom in said third chamber to move settled solids toward said outlet, a second tank laterally adjacent to said first tank and in communication therewith through said outlet of said third chamber, conveyor means in said second tank mounted to receive solids from said outlet, a cover over each of said tanks, liquid discharge means in an upper portion of said second tank below said cover for discharging liquid and maintaining a predetermined liquid level and overlying freeboard space in both of said tanks, and solids discharge means enabling discharge of solids from said second tank at a location remote from that at which solids are received from said third chamber of said first tank.

6. Apparatus according to claim 5 with the addition of means for transferring vapor from the freeboard space of one of said tanks to that of the other of said tanks comprising a conduit interconnecting said freeboard spaces, a venturi section in said conduit, liquid supply means mounted to forcibly inject a liquid spray into said venturi section for creating a vacuum while simultaneously contacting vapors with liquid to carry them into said other tank, and a feedwell in the other of said tanks mounted to receive vapors and liquids from said conduit said feedwell terminating below said effluent discharge means in said second tank.

7. Apparatus according to claim 5 in which said second tank has an inclined bottom portion, said conveyor comprises rotatably driven screw means mounted along said inclined bottom portion, said bottom portion and screw being arranged to receive solids from said outlet of said third chamber of said first tank adjacent its lower end and at an elevation above the lowermost flight of said screw, said solids discharge means of said second tank being positioned above the liquid discharge means therein, said screw being mounted to terminate at its upper end adjacent said solids discharge means of said second tank, and means sealing said solids discharge opening against vapor from said freeboard spaces comprising a transverse baffle secured to the cover of said second tank and extending downwardly therefrom to terminate below said liquid discharge means and above said solids discharge means.

References Cited in the file of this patent

UNITED STATES PATENTS

| | | |
|---|---|---|
| 845,190 | Osborne | Feb. 26, 1907 |
| 934,205 | Nix | Sept. 14, 1909 |
| 1,894,696 | Lindemann | Jan. 17, 1933 |
| 2,017,031 | Stratton | Oct. 8, 1935 |
| 2,259,221 | Darby et al. | Oct. 14, 1941 |
| 2,261,390 | Kite et al. | Nov. 4, 1941 |
| 2,443,686 | Malimgren | June 22, 1948 |
| 2,694,000 | Azbe | Nov. 9, 1954 |
| 3,019,906 | Allen | Feb. 6, 1962 |